(No Model.)
J. S. SPENCER.
FRAME FOR SPECTACLES.
No. 502,782. Patented Aug. 8, 1893.
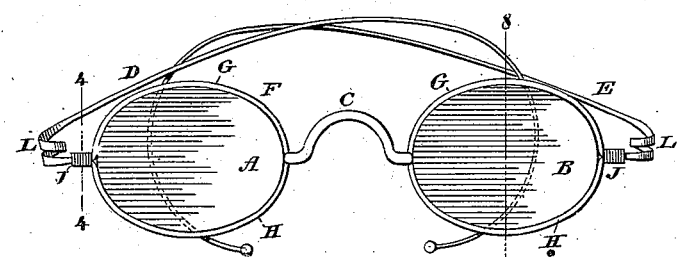
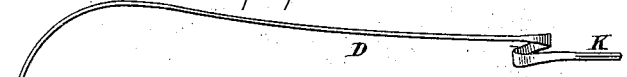
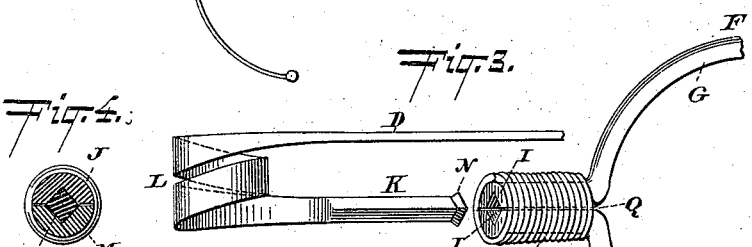
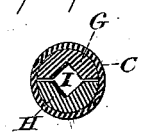
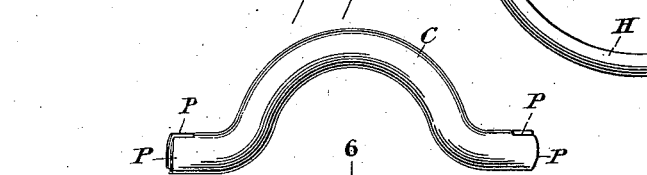
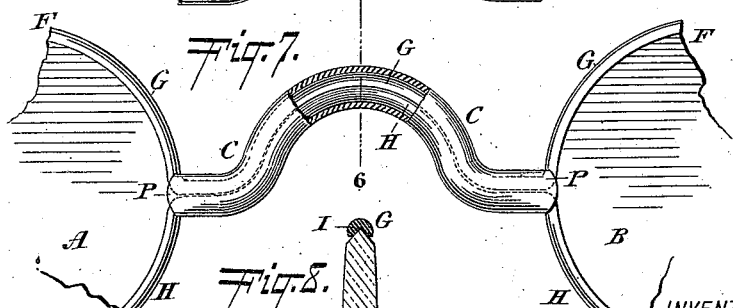
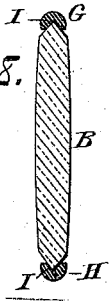
WITNESSES:
Gustave Dietrich.
R. A. Portcous
INVENTOR
John S. Spencer,
BY Chas. C. Gill
ATTORNEY.

UNITED STATES PATENT OFFICE.

JOHN S. SPENCER, OF NEW YORK, N. Y.

FRAME FOR SPECTACLES.

SPECIFICATION forming part of Letters Patent No. 502,782, dated August 8, 1893.

Application filed June 18, 1892. Serial No. 437,173. (No model.)

*To all whom it may concern:*

Be it known that I, JOHN S. SPENCER, a citizen of the United States, and a resident of New York, in the county of New York and State of New York, have invented certain new and useful Improvements in Frames for Spectacles, of which the following is a specification.

The invention relates to improvements in frames for spectacles, and consists in the novel features of construction hereinafter described and particularly pointed out in the claims.

Referring to the accompanying drawings Figure 1 is a perspective view of a pair of spectacles provided with frames constructed in accordance with the invention; Fig. 2 a detached perspective view of one of the temples; Fig. 3 an enlarged detached view of one end of the spectacle frames showing the manner of securing the temple thereto; Fig. 4 an enlarged vertical section through said end of the frame and the inclosed shank of the temple; Fig. 5 an enlarged detached perspective view of the nose piece; Fig. 6 a vertical section through same. Fig. 7 is an enlarged face view of the nose piece and adjoining portions of the spectacle frame, and Fig. 8 a vertical section through one of the lenses and inclosing frame.

In the drawings A, B, designate the lenses; C the nose piece; D, E, the temples, and F the spectacle frame composed of the upper and lower sections G, H, which are composed of wire containing, preferably, the right-angular grooves I on their facing edges adapted to firmly secure the lenses A, B. The sections G, H, fit the upper and lower edges of the lenses A, B, and extend through the tubular nose-piece C, and at the ends of the spectacles the sections G, H, are brought together forming lugs J, which are hollow and receive the shanks K of the temples D, E, the latter being angular in cross-section and fitting the corresponding hollow interior of the lugs J. The fact that the interior of the lugs J is angular in cross-section is important since the correspondingly formed shanks K of the temples D, E, are thereby locked against axial revolution therein. It is not to be understood however, that the invention is in every instance confined to the angular form of the interior of the lugs J, nor to the angular groove along the inner edges of the sections G, H. The temples D, E, are each of a single piece of material adapted at one end to pass over the ears of the wearer and at the other provided with the shanks K and coil L, the latter being, preferably, flattened and affording a spring whose tension is inward toward the lens. The coil L terminates at one end in the shank K and is in close proximity to the lug J. The temples, as above described, have their shanks K inclosed within the lugs J, and they are there firmly, though detachably, held by means of small sleeves M closely encompassing the lugs and gripping their opposite sides against said shanks. The sleeves M may be of any construction desired, although I have found it convenient to form them of short sections of a closely coiled spiral spring, as shown. In order the more securely to retain the shanks K of the temples in the lugs J, the inner ends of said shanks may be provided with a small head N fitting the slightly increased space formed by the divergence of the sections G, H, on their passage around the lens.

The nose-piece C is tubular and receives the middle portion of the wire sections G, H, as shown. In the manufacture of the goods the tube for the nose piece is perfectly straight when the sections G, H, with their grooved edges brought together are inserted through it, and thereafter said tube with the inclosed portion of the sections is bent into the appropriate outline. The ends of the nose-piece C are slotted vertically to form the lips P which extend to the edge of the lenses A, B, and effectually cover the small triangular spaces formed by the divergence of the sections G, H, on their passage from the ends of the tubular nose-piece to the edges of the lenses.

The spectacle frame constructed as above described is advantageous in many particulars, and as will be observed said frame is entirely devoid of rivets, hinges and soldered joints. The coils L formed in the tempered wire of the temples dispense with the necessity for hinged joints and permit the closing of the temples toward each other preparatory to the placing of the spectacles in the customary pocket case. The coils L also cause the temples to have a spring tension toward the face of the wearer and aid in securing the spectacles when in use. Should it be desired at any time to remove either or both of the lenses A, B, it will simply be necessary to move the sleeves M outward from the lugs J, when the sections G, H, will spring apart sufficiently to permit the escape of the lenses. In restoring the lenses to the frame, they may be effectually secured by placing them in position and moving the sleeves M back upon the lugs J.

What I claim as my invention, and desire to secure by Letters Patent, is—

1. The frame F composed of the independent upper and lower sections G H, grooved on their facing edges and at their outer portions inclosing the lenses, combined with the tubular nose piece C encircling the upper and lower sections throughout their length between the lens inclosing portions to cover the joint between the two sections, substantially as and for the purposes described.

2. The frame F composed of the independent upper and lower sections G H grooved on their facing edges and at their outer portions inclosing the lenses combined with the encircling tubular nose piece C extending from one lens to the other, and having on opposite sides of its ends the covering lips P, P, substantially as and for the purposes described.

3. The spectacle frame having the sectional lugs at its ends, combined with the temples whose shanks are within said lugs, and the securing sleeves upon said lugs; substantially as set forth.

4. The spectacle frame having the sectional lugs at its ends, combined with the temples, whose shanks are within said lugs and headed at their inner end, and the securing sleeves upon said lugs; substantially as set forth.

5. The spectacle frame having the sectional lugs at its ends, the hollow interior thereof being angular in cross-section, combined with the temples whose shanks are also angular in cross section and secured within said lugs; substantially as set forth.

6. The spectacle frame composed of the upper and lower grooved sections inclosing the opposite edges of the lenses and forming hollow lugs at the end of the frame, combined with the temples having shanks within said lugs and spring coils adjacent thereto, and the securing sleeves upon said lugs; substantially as set forth.

Signed at New York, in the county of New York and State of New York, this 3d day of June, A. D. 1892.

JOHN S. SPENCER.

Witnesses:
 CHAS. C. GILL,
 ED. D. MILLER.